(12) United States Patent
DuBridge et al.

(10) Patent No.: US 10,821,901 B2
(45) Date of Patent: Nov. 3, 2020

(54) BLIND SPOT MODULE WITH OFF INDICATOR

(71) Applicant: Gentex Corporation, Zeeland, MI (US)

(72) Inventors: Todd M. DuBridge, Grand Haven, MI (US); Martin L. Budek, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/360,687

(22) Filed: Mar. 21, 2019

(65) Prior Publication Data

US 2019/0291646 A1 Sep. 26, 2019

Related U.S. Application Data

(60) Provisional application No. 62/646,166, filed on Mar. 21, 2018.

(51) Int. Cl.
| | |
|---|---|
| *B60Q 1/26* | (2006.01) |
| *B60R 1/12* | (2006.01) |
| *B60Q 9/00* | (2006.01) |
| *B60Q 1/00* | (2006.01) |
| *B60R 1/06* | (2006.01) |

(52) U.S. Cl.
CPC .......... *B60R 1/1207* (2013.01); *B60Q 1/0035* (2013.01); *B60Q 1/0041* (2013.01); *B60Q 1/2665* (2013.01); *B60Q 9/008* (2013.01); *B60R 1/06* (2013.01)

(58) Field of Classification Search
CPC .... B60Q 9/008; B60Q 1/0035; B60Q 1/0041; B60Q 1/2665; B60R 1/006; B60R 1/06; B60R 1/1207; B60R 2001/1215; G02F 1/157

USPC ................ 340/425.5, 435, 436, 903, 815.4
See application file for complete search history.

(56) References Cited

U.S. PATENT DOCUMENTS

| | | | |
|---|---|---|---|
| 5,669,705 A | 9/1997 | Pastrick et al. | |
| 5,786,772 A * | 7/1998 | Schofield | B60R 1/12 |
| | | | 180/167 |
| 5,798,575 A | 8/1998 | O'Farrell et al. | |
| 5,803,579 A | 9/1998 | Turnbull et al. | |
| 5,871,275 A | 2/1999 | O'Farrell et al. | |
| 6,111,683 A | 8/2000 | Cammenga et al. | |
| 6,244,716 B1 | 6/2001 | Steenwyk et al. | |

(Continued)

FOREIGN PATENT DOCUMENTS

| | | |
|---|---|---|
| JP | H0681836 U | 11/1994 |
| WO | 2000030893 A1 | 6/2000 |

*Primary Examiner* — Hung T Nguyen
(74) *Attorney, Agent, or Firm* — Price Heneveld LLP; Bradley D. Johnson (57) ABSTRACT

A vehicular blind spot detection system for alerting a driver of a motor vehicle to an object in a blind spot zone of the vehicle includes a sensor configured to detect the presence of an object proximate to the vehicle in the blind spot zone. A first indicator is disposed on an outside rearview assembly and is configured to indicate that an object is in the blind spot zone of the vehicle. A controller is operably coupled with at least one of the sensor and the first indicator, wherein the controller may be activated and deactivated by a user. A second indicator is disposed proximate the first indicator and is configured to indicate that the controller has been deactivated.

18 Claims, 6 Drawing Sheets

(56) References Cited

U.S. PATENT DOCUMENTS

| | | |
|---|---|---|
| 6,280,041 B1 | 8/2001 | Unger et al. |
| 6,315,437 B1 | 11/2001 | Katz et al. |
| 6,570,998 B1 | 5/2003 | Ohtsuka et al. |
| 6,737,964 B2 | 5/2004 | Samman et al. |
| 6,744,353 B2 | 6/2004 | Sjönell |
| 6,919,796 B2 | 7/2005 | Boddy et al. |
| 7,004,592 B2 | 2/2006 | Varaprasad et al. |
| 7,042,616 B2 | 5/2006 | Tonar et al. |
| 7,355,524 B2 | 4/2008 | Schofield |
| 7,626,749 B2 | 12/2009 | Baur et al. |
| 7,991,522 B2 | 8/2011 | Higgins-Luthman |
| 8,004,425 B2 | 8/2011 | Hoek et al. |
| 8,044,776 B2 | 10/2011 | Schofield et al. |
| 8,310,353 B2 | 11/2012 | Hinninger et al. |
| 8,503,060 B2 | 8/2013 | Thomas et al. |
| 9,586,525 B2 * | 3/2017 | Sejalon .................. B60R 1/00 |
| 9,659,498 B2 * | 5/2017 | Kendall .................. B60R 1/06 |
| 9,767,695 B2 | 9/2017 | Hoek et al. |
| D837,112 S | 1/2019 | Hamlin et al. |
| 2002/0041443 A1 | 4/2002 | Varaprasad et al. |
| 2003/0002179 A1 | 1/2003 | Roberts et al. |
| 2004/0052084 A1 | 3/2004 | Lin |
| 2004/0070857 A1 | 4/2004 | Bonardi et al. |
| 2007/0019296 A1 | 1/2007 | Bauer et al. |
| 2008/0291275 A1 | 11/2008 | Hubert et al. |
| 2009/0059403 A1 | 3/2009 | Chang |
| 2009/0147083 A1 | 6/2009 | Pawlicki et al. |
| 2009/0244741 A1 | 10/2009 | Schondorf et al. |
| 2010/0020380 A1 | 1/2010 | Tonar et al. |
| 2013/0093581 A1 | 4/2013 | Arai |
| 2017/0144617 A1 * | 5/2017 | Lee .................. B60W 30/182 |
| 2017/0267173 A1 | 9/2017 | Goo et al. |
| 2017/0341576 A1 | 11/2017 | Lei et al. |

* cited by examiner

BLIND SPOT MODULE WITH OFF INDICATOR

CROSS-REFERENCE TO RELATED APPLICATION

This application claims priority to and the benefit under 35 U.S.C. § 119(e) of U.S. Provisional Application No. 62/646,166, filed on Mar. 21, 2018, entitled "BLIND SPOT MODULE WITH OFF INDICATOR," the disclosure of which is hereby incorporated herein by reference in its entirety.

FIELD OF THE DISCLOSURE

The present disclosure generally relates to a blind spot detection system for alerting a driver of a motor vehicle to an object in a blind spot zone of the vehicle.

SUMMARY OF THE DISCLOSURE

According to one aspect of the present disclosure, a blind spot detection system for alerting a driver of a motor vehicle to an object in a blind spot zone of the vehicle includes a sensor configured to detect the presence of an object proximate to the vehicle in the blind spot zone. The blind spot detection system further includes a first indicator disposed on an outside rearview assembly configured to indicate that an object is in the blind spot zone. A controller is operably coupled with at least one of the sensor and the first indicator, wherein the controller may be activated and deactivated by a user. A second indicator is disposed proximate the first indicator and is configured to indicate the controller has been deactivated.

According to another aspect of the present disclosure, an exterior rearview assembly for a vehicle includes a vehicular blind spot detection system. The exterior rearview assembly further includes sensor configured to detect the presence of an object in a blind spot zone of said vehicle. A first indicator is configured to indicate that the object is in the blind spot zone of said vehicle. A controller is operably coupled with at least one of the sensor and the first indicator, wherein the controller may be activated and deactivated by a user. A second indicator is configured to indicate that the controller has been deactivated.

According to yet another aspect of the present disclosure, a vehicular blind spot detection system for alerting a driver of a motor vehicle to an object in a blind spot zone of a vehicle includes a first indicator disposed on an outside rearview assembly. The first indicator activates when said object is in said blind spot zone of said vehicle. A controller includes an interface and is operably coupled with at least one of a sensor and the first indicator. The controller is configured to activate and deactivate at least one of the sensor and the first indicator. The interface is configured to receive instructions from a user which results in the controller activating and deactivating the at least one of the sensor and the first indicator. A second indicator is configured to indicate that the controller has deactivated the at least one of the sensor and the first indicator.

According to still another aspect of the present disclosure, a vehicular blind spot detection system for a vehicle includes a sensor configured to detect the presence of an object outside the vehicle. The vehicular blind spot detection system includes a first indicator configured to indicate that an object is in the blind spot zone of the vehicle. A controller is operably coupled with both the sensor and the first indicator. The controller may be activated and deactivated by a user. A second indicator is also provided. The second indicator is configured to indicate to a user that the controller has been deactivated such that the first indicator will not indicate that an object is in the blind spot zone of the vehicle. This configuration provides notice to a user that the controller should be activated if the user desires a visual indicator that an object is in the blind spot zone of the vehicle.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to a vehicular blind spot detection system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
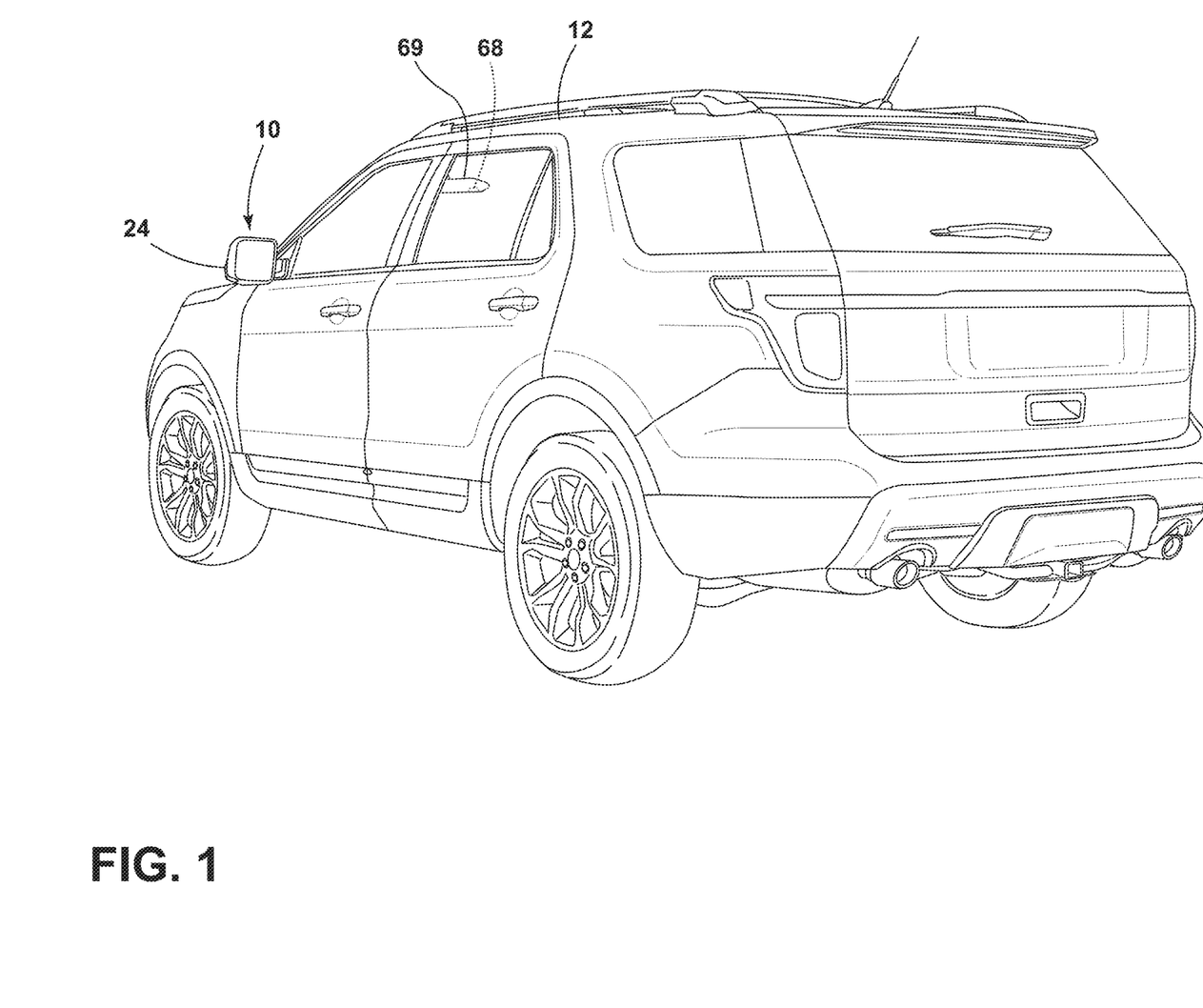
FIG. 1 is a rear perspective view of a vehicle incorporating a blind spot detection system of the present disclosure.
Figure 2:
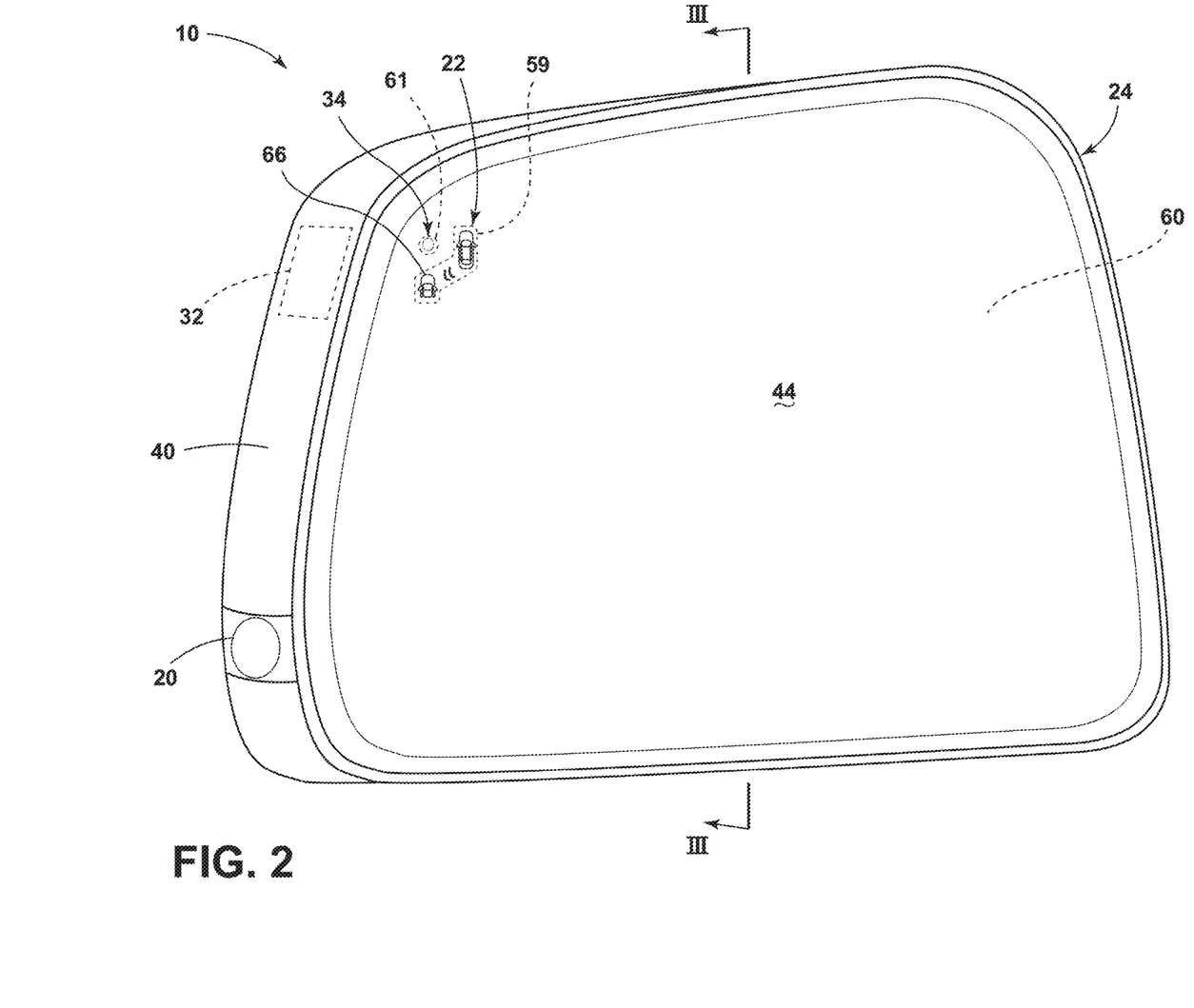
FIG. 2 is a front elevational view of an exterior rearview assembly of the present disclosure.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-5, reference numeral 10 generally designates a blind spot detection system for alerting a driver of a motor vehicle 12 to an object 14 in a blind spot zone 16 of the vehicle 12 includes a sensor 20 configured to detect the presence of an object 14 proximate to the vehicle 12 in the blind spot zone 16. The blind spot detection system 10 further includes a first indicator 22 that may be disposed on a top outboard position of an outside rearview assembly 24 that is configured to indicate that an object 14 is in the blind spot zone 16. A controller 32 is operably coupled with at least one of the sensor 20 and the first indicator 22. The controller 32 may be activated and deactivated by a user. A second indicator 34 is disposed proximate the first indicator 22 and configured to indicate the controller 32 has been deactivated.

With reference again to FIGS. 1 and 5, the exterior rearview assembly 24 is generally configured for use on any of a multitude of vehicles, including trucks, cars, motorcycles, etc. The rearview assembly 24 includes a housing 40 that is configured to support and protect a display module 42. This display module 42 may include an at least partially reflective element, such as an electro-optic element 44, etc., that is operably coupled with the sensor 20, which may be an optical sensor such as an imager. Alternatively, the sensor 20 may use lidar, radar, or sonar technologies configured to detect objects 14 that are a predetermined distance from the vehicle 12. The sensor 20 may be positioned on various parts of the vehicle 12 or the rearview assembly 24. The sensor 20 will typically be directed rearward toward the blind spot zone 16 of the vehicle 12. In cases where the sensor 20 is an imager, the imager will include a field of view that completely, or at least partially, encompasses the blind spot zone 16 of the vehicle 12. Use of the electro-optic element 44 provides a reflected image to the driver of an area α adjacent to and behind the vehicle 12.

Figure 3:
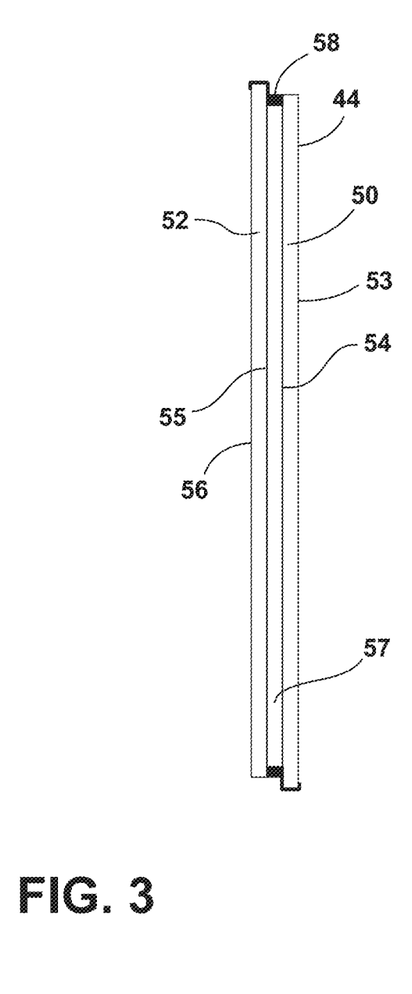
FIG. 3 is a side cross-sectional view of an electro-optic assembly of the exterior rearview assembly of FIG. 2, taken at line III.

With reference now to FIG. 3, the electro-optic element 44 may include first and second substrates 50, 52, respectively. The first and second substrates 50, 52 may be made of glass, a polymeric material, or any other material known in the art. The first substrate 50 defines a first surface 53 and a second surface 54 and the second substrate 52 defines a third surface 55 and a fourth surface 56. An electro-optic medium 57 is disposed between the first substrate 50 and the second substrate 52. A seal 58 extends between the first substrate 50 and the second substrate 52. The electro-optic medium 57 is sealed between the circumferential seal 58, and the first and second substrates 50, 52. A reflective coating may be disposed on the third surface 55 or the fourth surface 56. The reflective coating may be configured to provide a reflection of the area behind the vehicle 12 to a driver. The electro-optic element 44 may extend behind the first indicator 22 and the second indicator 34. Alternatively, it is also contemplated that only the first substrate 50 may extend behind the first indicator 22 and the second indicator 34. In this instance, first and second light sources 59, 61 may be disposed behind the first and second indicators 22, 34, respectively, and configured to illuminate as set forth in detail herein. The first and second light sources 59, 61 may be LEDs, halogen, fluorescent, compact fluorescent, etc.

The display module 42 may also include a display 60 that shows image data captured by an imager located in or on the vehicle 12 or the rearview assembly 24. The display 60 may be used instead of or in addition to the electro-optic element 44. The display 60 may have a display area generally equivalent to the size and shape of the reflective coating present on the third surface 55 or the fourth surface 56 of the second substrate 52. It is contemplated that the sensor 20 that detects objects 14 in the blind spot zone 16 may be an imager that captures image data and presents the image data on the display 60 of the display module 42. The display 60 may be located behind the electro-optic element 44, or may be utilized with a single substrate with a partially reflective surface. When the display module 42 includes a display 60 and an electro-optic element 44, the reflective coating on the third surface 55 and/or fourth surface 56 of the electro-optic element 44 may provide a reflection of a rear portion of the vehicle 12 when the display 60 is not activated.

Figure 4A:
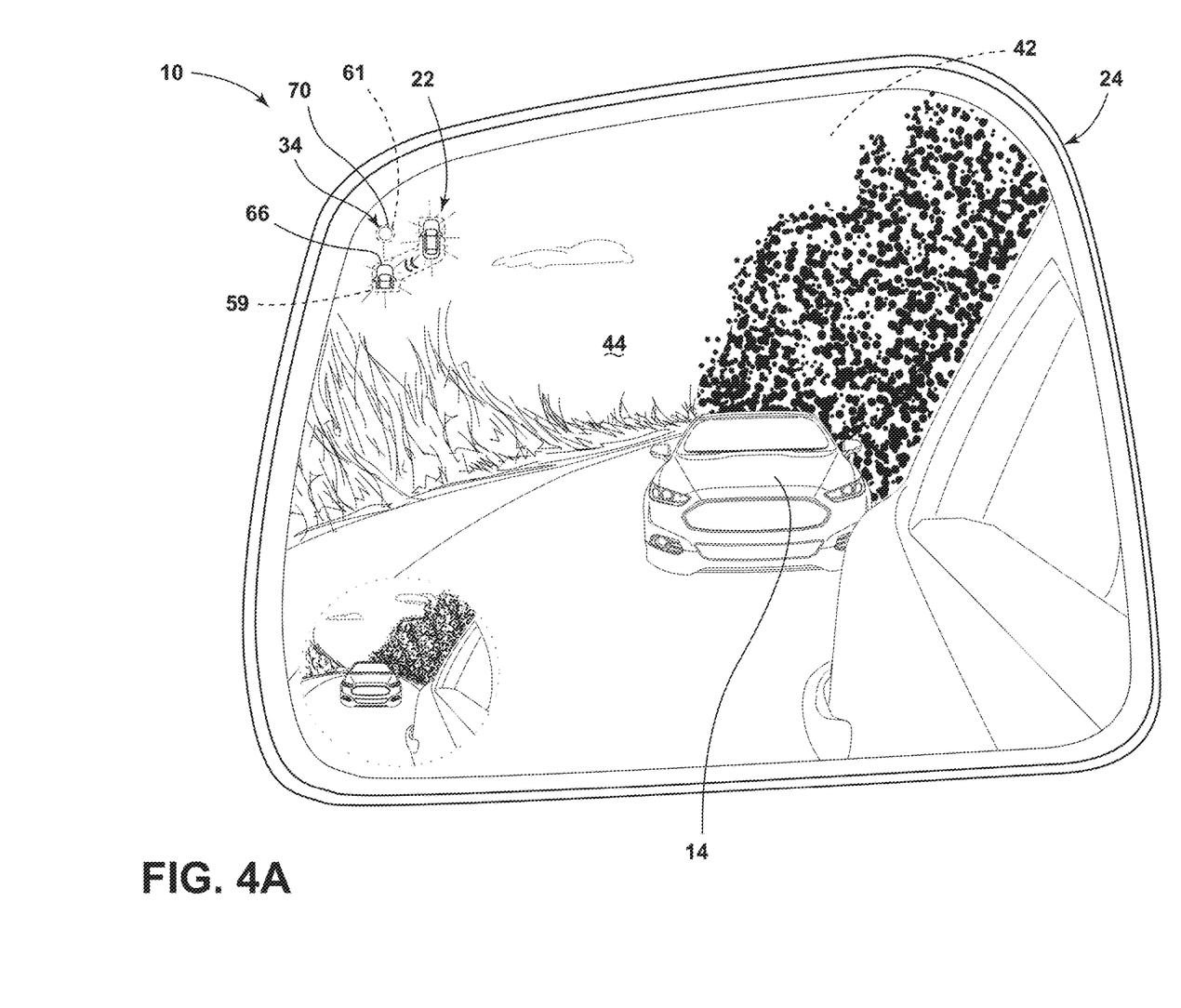
FIG. 4A is a front elevational view of an exterior rearview assembly of the present disclosure while the blind spot detection system is activated.

With reference now to FIG. 4A, when an object 14 (such as a trailing vehicle) is in the blind spot zone 16, the object 14 may not be visible on the reflective surface of the electro-optic element 44 or on the display 60 (if the display module 42 includes the display 60). Accordingly, the sensor 20, may be positioned on or in the exterior rearview assembly 24 to capture object data in area β (FIG. 5), which coincides with the blind spot zone 16. However, it is also generally contemplated that the sensor 20 may include an imager that projects rearward through an aperture defined in the housing 40, or positioned adjacent a window defined in the housing 40, in a direction toward the blind spot zone 16 of the vehicle 12. Alternatively, the imager may project rearward through a clear, or at least partially clear, portion of the electro-optic element 44. In this instance, the imager may be positioned proximate an area of the electro-optic element 44 that does not include the second substrate 52. Accordingly, the imager can project through the first substrate 50 in a direction of the blind spot zone 16 of the vehicle 12. In the illustrated embodiment, the blind spot detection system 10 may be configured to display a warning via the first indicator 22 when another vehicle or object 14 is positioned in the blind spot zone 16 of the vehicle 12. The warning may have any of a variety of indicators, including lit indicia, such as a blind spot warning indicator 66, in the form of a car and a half-car, to designate that the object 14 is in the blind spot zone 16. When the object 14, such as another vehicle, has moved to the blind spot zone 16, the sensor 20 is triggered which signals the controller 32 to illuminate the indicia which may be shown on, through, or adjacent to the electro-optic element 44 (FIG. 3). More specifically, the controller 32 activates the first light source 59 which consequently illuminates the first indicator 22, which may be the blind spot warning indicator 66. As previously noted, the first indicator 22 may be proximate the electro-optic element 44, the housing 40, or elsewhere in the vehicle 12.

With reference again to FIG. 4A, the rearview assembly 24 is configured to provide an image to a user of an area rearward of the vehicle 12. As previously noted, the image may be a reflection provided by a reflective surface of an electro-optic assembly, for example, or may be image data provided on a display, such as display 60, wherein the image data is captured by an imager in or on the vehicle 12 or in or on the exterior rearview assembly 24. The first indicator 22, which may be blind spot warning indicator 66 is disposed on an upper corner of the electro-optic element 44. However, it will be understood that the blind spot warning indicator 66 may also be disposed elsewhere on the electro-optic element 44 or on the housing 40 of the rearview assembly 24, inside or outside of the vehicle 12. While the object 14 is in the blind spot zone 16, the blind spot warning indicator 66, which in this instance is the indicia representing the car and the half-car, illuminates, thereby indicating to the driver that an object 14, in this case another vehicle, is in the blind spot zone 16 of the vehicle 12. Once the object 14 or other vehicle has been passed by the vehicle 12 or the object 14 or other vehicle has passed the vehicle 12, the first light source 59 disposed behind the blind spot warning indicator 66 is deactivated, thereby indicating that the object 14 or other vehicle is no longer present in the blind spot zone 16 of the vehicle 12.

Figure 4B:
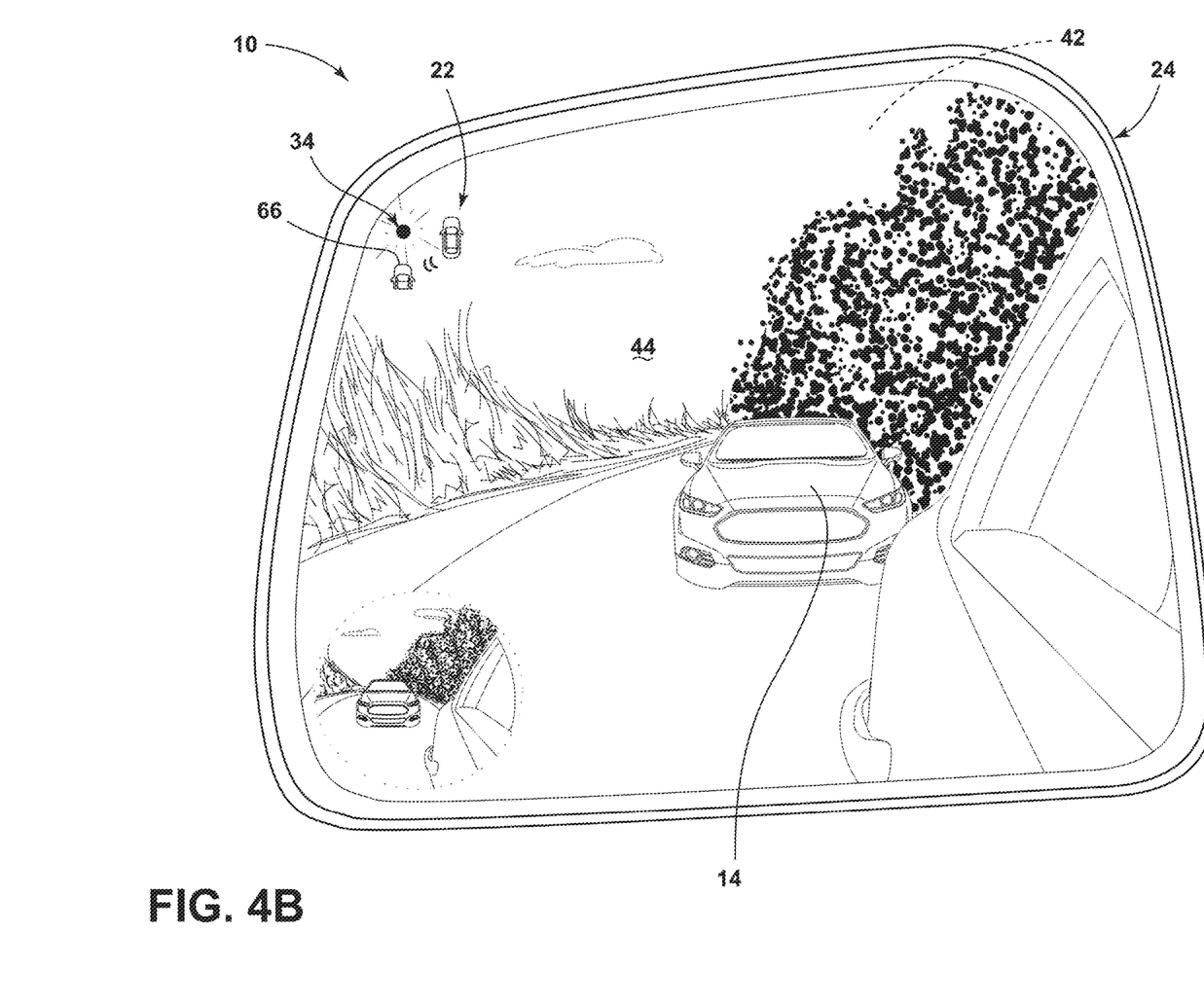
FIG. 4B is a front elevational view of the exterior rearview assembly of FIG. 4A while the blind spot detection system is deactivated.
Figure 5:
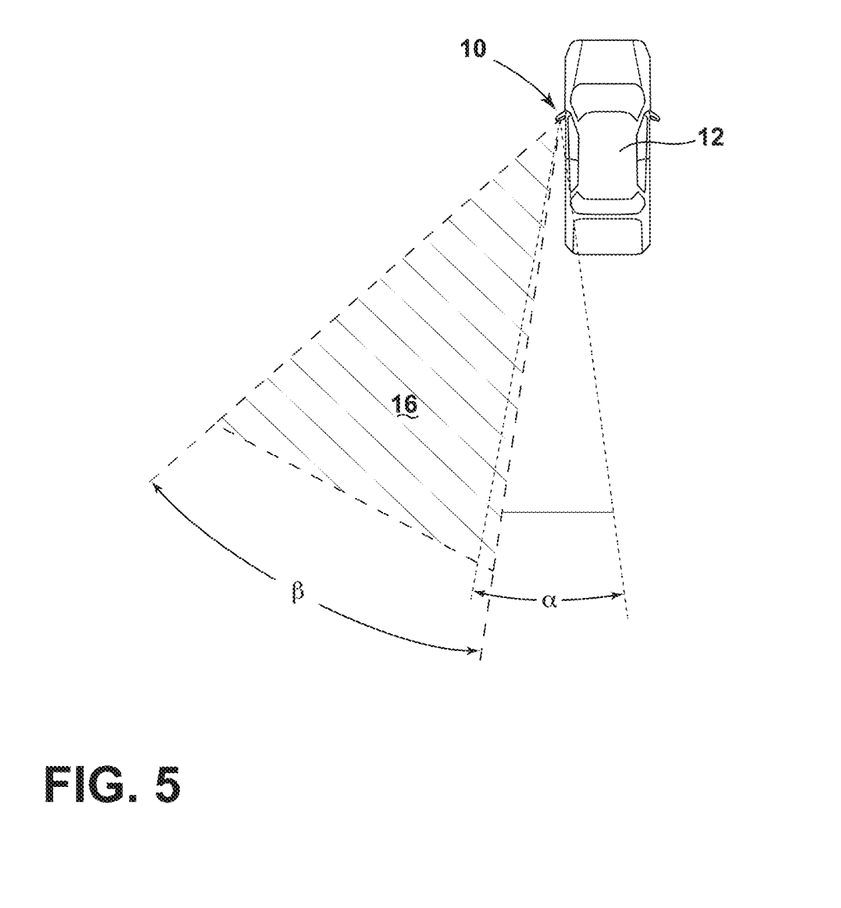
FIG. 5 is a top plan view of a vehicle using a blind spot detection system of the present disclosure.

With reference to FIG. 4B, it is generally contemplated that the blind spot detection system 10 may be deactivated by a user. Deactivation may be selected by a user through a manual, verbal, or gesture command inside the vehicle 12, possibly to a control interface 68 disposed in the vehicle 12 or as part of an interior rearview assembly 69. In this instance, the blind spot warning indicator 66 will not illuminate regardless of whether an object 14 or another vehicle is located in the blind spot zone 16 of the vehicle 12. In this instance, the second light source 61 behind the second indicator 34 is activated. Consequently, the second indicator 34, in the form of an illuminated dot 70, is shown, indicating to the driver that the blind spot detection system 10 has been deactivated and therefore will not indicate to the driver whether an object 14 is in the blind spot zone 16 of the vehicle 12. The illuminated dot 70 will remain lit until the blind spot detection system 10 is reactivated. In the event that the blind spot detection system 10 is reactivated, the second indicator 34, which in this case is shown by the illuminated dot 70, will no longer be illuminated, thereby indicating to a user that the blind spot detection system 10 is activated and that the blind spot warning indicator 66 will illuminate when an object 14, such as another vehicle, is located in the blind spot zone 16 of the vehicle 12. Although the illuminated dot 70 is shown, it will be understood that other possible configurations of the second indicator 34 are also possible. Further, the second indicator 34 may be disposed proximate the electro-optic element 44, the housing 40, or elsewhere inside or outside the vehicle 12.

Other variations to the structure set forth in FIG. 4B are also contemplated. For example, the second indicator 34 could be positioned on a periphery of the housing 40 that is visible to a seated driver. Further, the second indicator 34 may be integral with the first indicator 22, as a single unitary module. Alternatively, it is contemplated that the blind spot warning indicator 66 could be replaced with a constant "warning" color that continuously illuminates the blind spot warning indicator 66 a color that indicates to a driver that the blind spot detection system 10 has been deactivated. For example, upon deactivation by a driver, the blind spot warning indicator 66 may permanently illuminate a red color by the second indicator 34, thereby indicating to the driver that the blind spot detection system 10 has been deactivated. In this instance, the second indicator 34 illuminates the same indicia as the first indicator 22. Activation of the blind spot detection system 10 by the user would result in the blind spot warning indicator 66 no longer being lit by the continuous red illumination, indicating to the driver that the blind spot detection system 10 is activated.

It will be understood that the blind spot detection system 10 may be operable based on instructions or commands from a user. It is contemplated that the user may interact with the control interface 68 such as a touch pad disposed inside the vehicle 12. Alternatively, a microphone or imager may capture and implement verbal or gesture commands, respectively. In one instance, the control interface 68 is disposed in the interior rearview assembly 69 of the vehicle 12. In this instance, a command may be given by the user to deactivate, or otherwise "turn off," the blind spot detection system 10. The blind spot detection system 10 may be configured to deactivate the controller 32, which consequently results in deactivation of the sensor 20 and the first indicator 22. Alternatively, the blind spot detection system 10 may be configured such that the sensor 20 is deactivated such that no signal is sent to the controller 32 to activate the first indicator 22. In an alternative construction, the first indicator 22 is deactivated such that when the sensor 20 detects the object 14 in the blind spot zone 16, the controller 32 receives the signal, but does not send a signal to illuminate the first indicator 22. It will be understood that other variations to this construction are also possible.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicular blind spot detection system for alerting a driver of a motor vehicle to an object in a blind spot zone of a vehicle, the system comprising:
   a sensor configured to detect a presence of said object in said blind spot zone of said vehicle;
   a first indicator disposed on an outside rearview assembly, the first indicator configured to indicate that said object is in said blind spot zone of said vehicle;
   a controller operably coupled with the sensor and the first indicator, wherein the controller may be activated and deactivated by a user;
   a second indicator disposed proximate the first indicator, the second indicator configured to indicate that the controller has been deactivated, and
   a display module disposed proximate an electro-optic element and configured to display image data captured by an imager of said vehicle.

2. The vehicular blind spot detection system of claim 1, wherein the first and second indicators are visible through a glass substrate of the outside rearview assembly.

3. The vehicular blind spot detection system of claim 1, wherein the first indicator is indicia representing a car and a half-car.

4. The vehicular blind spot detection system of claim 1, wherein at least one of the first indicator and the second indicator is located at a top outboard position of the outside rearview assembly.

5. The vehicular blind spot detection system of claim 1, wherein the second indicator illuminates a red color when the controller has been deactivated.

6. The vehicular blind spot detection system of claim 5, wherein the second indicator illuminates the same indicia as the first indicator.

7. The vehicular blind spot detection system of claim 1, further comprising:
   an interface disposed inside said vehicle and configured to receive user instructions regarding activation and deactivation of at least one of the first indicator and the sensor.

8. An exterior rearview assembly for a vehicle having a vehicular blind spot detection system, the exterior rearview assembly comprising:
   a sensor configured to detect a presence of an object in a blind spot zone of said vehicle;
   a first indicator configured to illuminate to indicate that the object is in the blind spot zone of said vehicle, wherein the first indicator is indicia representing a car and a half-car;
   a controller operably coupled with and configured to activate and deactivate at least one of the sensor and the first indicator;
   a second indicator configured to illuminate and adjacent to the first indicator, the second indicator configured to indicate that the controller has been deactivated; and
   a display module disposed proximate an electro-optic element and configured to display image data.

9. The exterior rearview assembly of claim 8, wherein the first and second indicators are visible through a glass substrate of said exterior rearview assembly.

10. The exterior rearview assembly of claim 8, wherein at least one of the first indicator and the second indicator is located at a top outboard position of said exterior rearview assembly.

11. The exterior rearview assembly of claim 8, wherein the second indicator is integral with the first indicator.

12. The exterior rearview assembly of claim 11, wherein the second indicator illuminates the same indicia as the first indicator.

13. The exterior rearview assembly of claim 8, further comprising:
   an interface disposed inside said vehicle and configured to receive user instructions regarding activation and deactivation of at least one of the first indicator and the sensor.

14. A vehicular blind spot detection system for alerting a driver of a motor vehicle to an object in a blind spot zone of a vehicle, the system comprising:
   a first indicator visible on an electro-optic element of an outside rearview assembly, the first indicator activating when said object is in said blind spot zone of said vehicle;
   a controller including an interface and operably coupled with at least one of a sensor and the first indicator, wherein the controller is configured to activate and deactivate at least one of the sensor and the first indicator, and wherein the interface is configured to receive instructions from a user which results in the controller activating and deactivating the at least one of the sensor and the first indicator;
   a second indicator visible on the electro-optic element and configured to indicate that the controller has deactivated the at least one of the sensor and the first indicator; and
   a display module disposed proximate the electro-optic element and configured to display image data captured by an imager of said vehicle.

15. The vehicular blind spot detection system of claim 14, wherein the first indicator is indicia representing a car and a half-car.

16. The vehicular blind spot detection system of claim 15, wherein the second indicator illuminates the same indicia as the first indicator.

17. The vehicular blind spot detection system of claim 14, wherein at least one of the first indicator and the second indicator is located at a top outboard position of the outside rearview assembly.

18. The vehicular blind spot detection system of claim 14, wherein the second indicator is integral with the first indicator.

* * * * *